Dec. 11, 1951 R. W. RIECK 2,578,596
COMPRESSOR GAS TURBINE COMBUSTION CHAMBER WITH ROTATING
AND RECIPROCATING VALVE THEREIN
Filed Sept. 11, 1946 2 SHEETS—SHEET 1
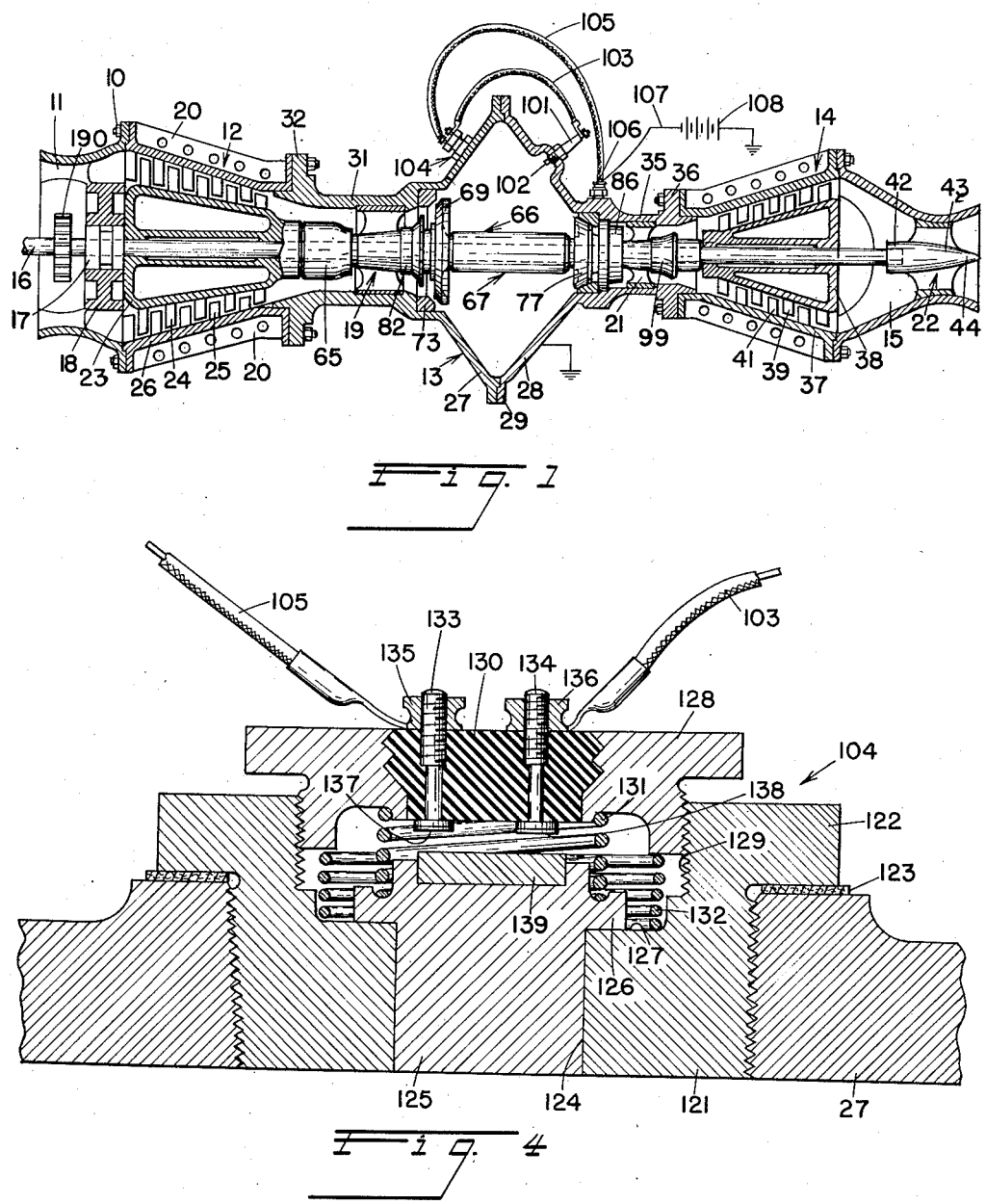
INVENTOR.
RUSSELL W. RIECK
BY
Strauch & Hoffman
attorneys

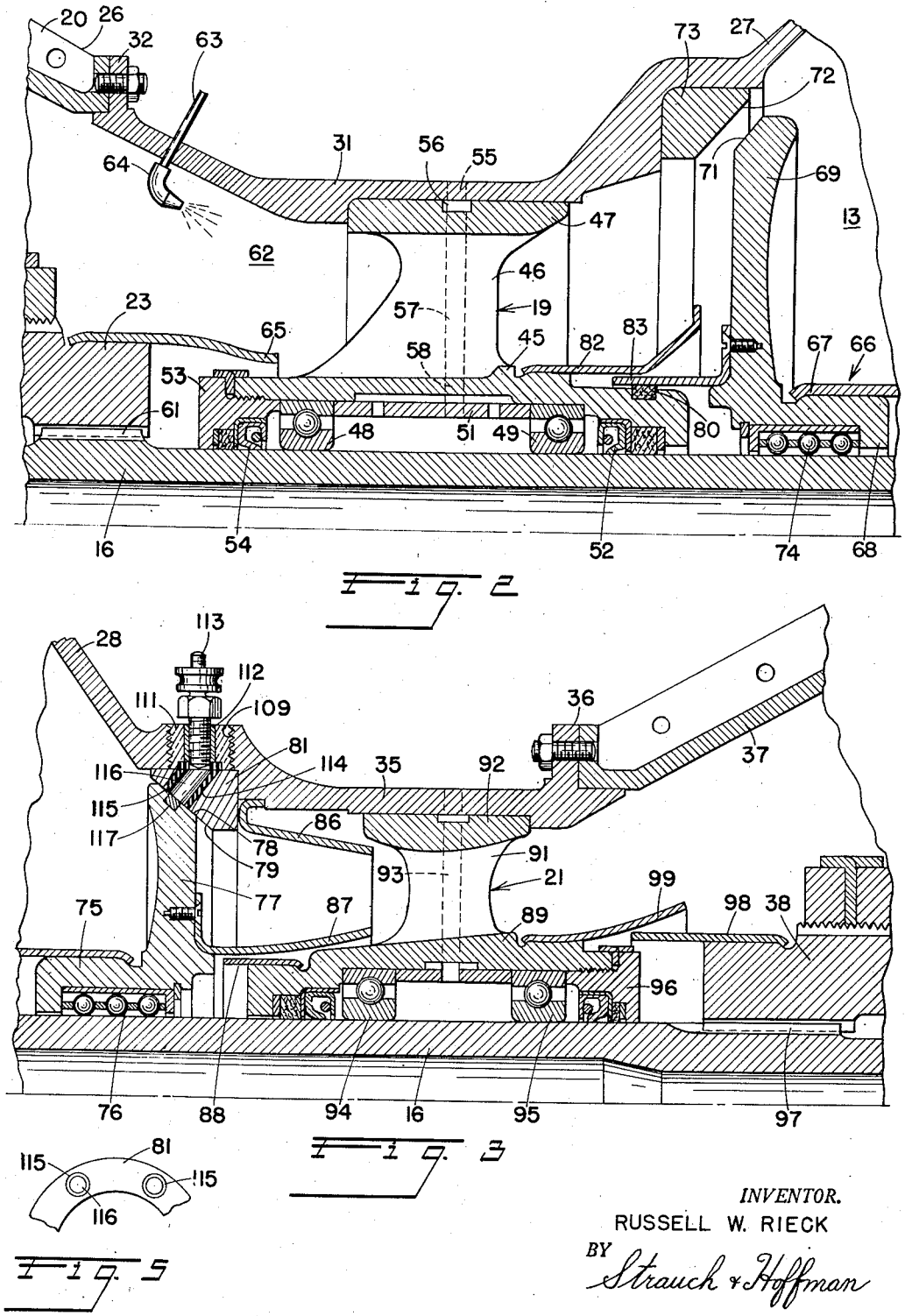

Patented Dec. 11, 1951

2,578,596

UNITED STATES PATENT OFFICE 2,578,596

COMPRESSOR GAS TURBINE COMBUSTION CHAMBER WITH ROTATING AND RECIPROCATING VALVE THEREIN

Russell W. Rieck, Detroit, Mich.

Application September 11, 1946, Serial No. 696,193

11 Claims. (Cl. 60—39.8)

My invention relates to the gas turbine type of power plant which has become of extremely active interest recently in connection with high speed airplanes of the jet-propulsion type, and is particularly concerned with fuel economy and power regulation which is accomplished by a symmetrical and novel arrangement of the parts, with especial attention being devoted to the internal valve function and construction. My invention is embodied in a special in-line arrangement of the axial flow compressor and the axial flow exhaust turbine and the combustion chamber all arranged symmetrically about the axis of a power out-put shaft and particularly including a slidable valve arrangement controlling the inlet and outlet of the combustion chamber, together with special combustion controls which will later be described in detail.

It is the major object of my invention to provide a power plant of the gas turbine type wherein the compressor, exhaust turbine, and the combustion chamber are substantially symmetrical about the axis of an out-put power shaft, with basically new valve mechanism employed in the combustion chamber for positively controlling fuel consumption, compression, and power output.

A further object of my invention is to provide in a gas turbine a novel sliding valve arrangement associated with the inlet and outlet openings of the combustion chamber.

It is a further object of my invention to provide a novel combustion control arrangement for a gas turbine power plant wherein a switch is provided in the ignition system responsive to fluid pressure within the combustion chamber.

A further object of the invention is to provide a novel combustion control arrangement in the gas turbine power plant wherein movement of a valve for the combustion chamber controls the ignition system.

A further object of the invention is to provide a novel combustion control arrangement in the gas turbine wherein novel means are provided for controlling both the frequency and intensity of combustion.

A further object of the invention is to provide a novel pressure switch for ignition control.

Further objects of the invention will presently appear as the description proceeds in connection with the appended claims and the annexed drawings wherein:

Figure 1 is an axial elevation partly in section through a gas turbine power plant according to a preferred embodiment of my invention, illustrating the arrangement of the axial flow compressor and the exhaust turbine and the power plant;

Figure 2 is an enlarged fragmentary section illustrating the details of construction within the power plant at the intake end of the valve;

Figure 3 is an enlarged fragmentary section illustrating details of construction within the power plant at the exhaust end of the valve;

Figure 4 is an enlarged fragmentary elevation illustrating details of the pressure switch in the combustion chamber wall; and Figure 5 is a fragmentary end view of the exhaust valve seat illustrating the ignition control terminals.

Referring to Figure 1, the power plant comprises generally an air intake section 11, an axial flow compressor section 12, a combustion chamber section 13, an axial flow exhaust turbine section 14 and an exhaust passage 15, all symmetrical about the axis of a power output shaft 16 which is the drive shaft of the compressor. Air intake section 11 is peripherally flanged at its inner end to be secured to compressor section 12 as by bolts 10. Shaft 16 is supported for rotation about its axis in suitable anti-friction bearings such as those indicated at 17 in the aligned hubs of spiders 18, 19, 21 and 22, which are stationary with the outer housing of the power plant. Shaft 16 is preferably axially hollow and offers the possibility of liquid cooling therethrough.

Air intake section 11 comprises a substantially annular conduit which faces in the direction in which the airplane or other craft is moving whereby air enters in copious quantities to be delivered to the compressor section 12 directly behind it.

The compressor within section 12 comprises a rotor 23 which is splined or otherwise connected to shaft 16 so as to be rotatable therewith and carries radial blades 24 that cooperate with stationary blades 25 on the outer housing 26 of the compressor to substantially increase the pressure of the air entering from intake section 11 as it passes through the compressor. Preferably housing 26 is split along its longitudinal centerline and each half has longitudinal mating flanges 20 through which extend bolts or like fastening means for rigidly attaching the halves together. This structure facilitates installation of the stationary blades of the compressor. The compressor within section 12 is preferably an axial flow type but it may be any suitable compressor of either axial or centrifugal design used widely in this art and further disclosure thereof is not believed necessary to understand this invention.

Combustion chamber section 13 comprises a pair of mated housing parts 27 and 28 joined along a common flange section 29 as by bolts, rivets or the like. Housing section 27 on the side of the compressor 12 is formed with a hollow axial end boss 31 within which spider 19 is rigidly supported and boss 31 terminates in a flange 32 secured to a like flange on the output side of the housing 26.

Spider 19 is composed of a plurality of webs extending outwardly from its hub toward its rim portion which is rigidly secured to housing boss 31, these webs being made as thin and as few as compatible with structural strength so as not to interfere with the flow of air through the spider toward the combustion chamber 13.

Housing section 28 is formed with a hollow axial end boss 35 to which the rim of spider 21 is rigidly secured and terminates in a flange 36 secured to a cooperating flange on the intake end of housing 37 of the exhaust turbine within section 14. Housing 37 is longitudinally split and the halves are bolted together as in housing 26.

Splined or otherwise secured non-rotatively to shaft 16 beyond spider 21 is a rotor 38 of an exhaust turbine of the axial flow type having a series of radial blades 39 cooperatively associated with stationary blades 41 on housing 37. Beyond rotor 38, shaft 16 terminates in a suitable pilot journal at 42 in hub 43 of stationary spider 22. Like spider 19, spiders 21 and 22 are formed with the least and thinnest radial webs to get maximum air flow therethrough without sacrificing strength for supporting the shaft. In addition, hub 43 is formed at its outer terminus with a streamline portion 44 which extends through the flared outlet end of casing 15 to provide for maximum efficiency of jet propulsion.

Referring now to Figure 2, wherein the construction at the inlet end of the combustion chamber is detailed, spider 19 comprises a hollow hub 45 from which radiate a plurality of relatively thin webs joined at their outer ends by a circular rim 47 which is suitably non-rotatively secured within boss 31. Within hub 45, shaft 16 is rotatively journalled by means of roller bearing assemblies 48 and 49 separated by a spacer ring 51. The outer race of inner bearing assembly 49 is seated against a suitable internal shoulder in the hub and a suitable grease sealing arrangement 52 is provided between the hub and shaft 16. At the other end of hub 45, a retainer ring 53 which has a suitable grease sealing assembly 54 mounted thereon closes the end of the hub, being non-rotatively secured thereto in a suitable manner. Preferably ring 53 is threaded in hub 45 and bears against the inner race of bearing assembly 48 to maintain the bearings in position. Lubrication is provided to the interior of hub 45 by means of a lubricator aperture 55 in collar 31 communicating with an annular recess 56 in rim 47 and a duct 57 extending through one of webs 46 and through an aperture 58 into the interior of hub 45, and thence through holes in spacer ring 51 to bearings 48 and 49.

At the left side of Figure 2, the rotor 23 of the compressor is illustrated as splined to shaft 16 at 61. The outlet of compressor 12 discharges into a carburetion space defined by the end of housing 26 and boss 31 as illustrated at Figure 2, this space comprising a mixing chamber 62 wherein the high pressure air entering from the compressor is thoroughly admixed with gasoline, kerosene or like fluid fuel entering through a fuel supply system indicated diagrammatically by the conduit 63 projecting through a wall of housing 26 and terminating into a multi-aperture spray device 64 within the space.

Non-rotatively secured to the end of rotor 23 is an annular sheet metal deflector member 65 which extends over the adjacent end of hub 45 to prevent the combustible mixture from possibly entering the end of hub 25 to destroy the lubricating properties of the grease therein, but mainly to insure that the mixture is deflected through the vanes of spider 19 toward the combustion chamber.

Within combustion chamber 13, a valve 66 is mounted for axial slidable movement along shaft 16, its purpose being to control the inlet and outlet to the combustion chamber. Valve 66 comprises a tubular valve body 67 which at its left end in Figure 2 is non-rotatively secured to the hub 68 of a metal valve member 69 that is formed at its periphery with a smooth annular continuous frusto-conical valve face 71 adapted to coact with a similar frusto-conical smooth valve face 72 on a valve seat ring 73 rigidly secured as by pressing within the inner wall of housing section 27. Hub 68 is rotatably and slidably supported upon shaft 16, as by means of a roller bearing annulus 74 mounted in hub 68. At the other end of the valve body, as illustrated in Figure 3, a similar valve hub 75 rigidly attached to body 67 is rotatively and slidably mounted on shaft 16 by a similar roller bearing assembly 76.

Since valve 66 is rotatably mounted on drive shaft 16, it is capable of such free rotation relative to the housing parts as to provide uniform wear of the valve faces and seats as the contacting valve face and seat areas will be continually and automatically changing position during operation. This provides for better sealing at the valve and for more efficient operation.

Integral with hub 75 is a metal exhaust valve which is peripherally formed with a smooth annular frusto-conical face 78 adapted to seat upon a cooperating smooth annular frusto-conical face 79 in a valve seat ring 81 suitably rigidly secured to housing section 28 of the combustion chamber as illustrated in Figure 3.

Referring to Figure 2, a sheet metal annular deflector 82 is rigidly secured upon the exterior of hub 45 and cooperating therewith is a sheet metal deflector 83 rigidly secured upon the outer end of intake valve 69. An annular seal member 80 of asbestos or other fire resisting material is suitably mounted on hub 45 with its outer periphery in wiping contact with deflector 83 so as to provide a fluid-tight seal between the hub and the deflector for eliminating pressure loss through the valve body. These deflectors extend in interfitting relation so that the combustible mixture entering through spider 19 is always deflected toward the inlet space between valve seat faces 71 and 72 and is not permitted to discharge through the valve body. Deflector 83 is of such length as to perform its deflecting function even when the valve is in its wide open position as illustrated in Figure 2.

Beyond valve seat 81, the products of combustion passing through the exhaust outlet are deflected through spider 21 by the annular throat formed by a sheet metal annular deflector ring 86 rigid with boss 35 and a sheet metal annular deflector ring 87 rigidly attached to the outer end of exhaust valve 77. An annular ring 88 rigid with the hub 89 of spider 21 extends into interfitting overlapping arrangement with an annular deflector ring 87 on the exhaust turbine rotor to insure deflection even when the valve is in exhaust open position.

Spider 21 comprises a plurality of webs or vanes 91 extending radially from hub 89 and terminating in a circular rim 92 rigidly secured within housing boss 35. A suitable conduit arrangement indicated at 93, similar to that for hub 45 at the other end of the combustion chamber, is provided for lubricating the bearing assemblies 94 and 95 within hub 89, and the bearing and retainer construction within hub 89 is substantially the same as that described above for hub 45 except for being reversed, the retainer ring 96 being on the opposite end of the hub.

As illustrated in Figure 3, the inner end of the exhaust turbine rotor 38 is splined to shaft 16 as at 97. Rotor 38 carries at its inner end a sheet metal annular deflector ring 98 which extends in overlapping relation with a sheet metal annular deflecting ring 99 carried by hub 89 of the spider 21 to insure that the mixture exhausted through spider 21 is directed toward the intake end of the exhaust turbine 14.

I have provided a novel arrangement of combustion control for insuring accurate regulation of the frequency and intensity of combustion. As illustrated in Figure 1, a spark plug or like ignition device 101 is provided in the wall of housing 28 with its sparking terminal electrodes indicated at 102 within the combustion chamber, one of these terminals being grounded to the metal of housing 28. The insulated terminal of spark plug 101 is connected by lead 103 to a terminal of a pressure switch assembly indicated at 104 in Figure 1 and in detail in Figure 4, and the return lead 105 from the pressure switch assembly connected to a switch terminal 106 at the exhaust valve seat. A cooperating switch terminal (not shown) is insulated and circumferentially spaced from terminal 106, and a lead 107 from that terminal is provided to the power source 108.

The switch at the exhaust valve seat is adapted to close the circuit to the pressure switch assembly whenever the exhaust valve 77 is seated in the closed position of Figure 3. This may be accomplished in any suitable manner, and in the illustrated embodiment I have done this by providing in the wall of housing 28 a pair of circumferentially spaced threaded apertures 109 in which are mounted ceramic or other insulation bushings 111 lined with bonded metal sleeves 112. Each sleeve 112 threadedly supports a terminal stud 113 to which the lead 105 or 107 is attached. Ring 81 is formed with a pair of side by side bores 114 (Figure 5) lined with ceramic or other fire resisting sleeves 115 containing conductor buttons 116 which terminate flush with face 79 and which are engaged at their rear ends by stud assemblies 113. If desired, a suitable conductor ring 117 annularly continuous around face 78 of the exhaust valve may be provided for bridging buttons 116. With this arrangement it is obvious that when exhaust valve 77 is in its closed position of Figure 3 either the metal valve or the metal conductor ring 117 closes the ignition circuit, thereby connecting lead 105 to the source of energy 108.

As illustrated in Figure 4, the pressure switch assembly is mounted on a collar 121 threadedly mounted in a suitable aperture in wall 27 of the combustion chamber, collar 121 having an enlarged outer flange 122 overhanging a portion of the outer surface of wall 27 and a gasket 123 being disposed between the flange and the wall to prevent escape of combustion gases. Collar 121 is provided with a cylindrical bore 124 in which is slidably mounted a contact button 125 formed at its inner end with an enlarged radial flange 126 overhanging an internal shoulder 127 of collar 121 so as to limit inward movement of button 125 beyond the position shown in Figure 4. A cap member 128 is threaded in an internally threaded portion 129 of collar 121 whereby the axial spacing between cap 128 and the button 125 may be adjustably varied. A suitable coiled compression spring 131, provided reacting between cap 128 and button 125 and spring 131, resists movement of button 125 outwardly of the combustion chamber and toward cap 128. A second coiled compression spring 132 is provided between cap 128 and collar 121 to lock the adjusted position of collar 128.

Collar 128 is provided with a central insert 130 of insulating composition which carries a pair of spaced parallel conductor studs 133 and 134 that extend through the collar, stud 133 being secured by a nut to the end of lead 105 and stud 134 being secured by nut 136 to the end of lead 103. The inner ends of said studs 133 and 134 terminate in contacts 137 and 138 disposed opposite a conductor bar 139 which is partially imbedded or otherwise rigidly secured to the top surface of button 125. When button 125 is moved axially toward collar 128, as under the pressure of the fluid within the combustion chamber 13, bar 139 will bridge the contacts 137 and 138 to close the switch 104 and thereby complete the ignition circuit to spark plug 101.

In operation, air scooped through the nacelle 11 enters axial flow compressor 12 where it is compressed to a relatively high degree, and the compressed air is discharged into mixing space 62 where it is thoroughly mixed with the kerosene or other fluid fuel entering through spray nozzle 64.

The combustible mixture of fuel and compressed air flows through spider 19 and through the normally open annular passage between valve faces 71 and 72 at the inlet valve to enter the combustion chamber 13. The force of flow of the entering fuel mixture acting on valve 69 maintains the slidable valve 66 seated toward the right in Figure 1, which is its open inlet position.

As soon as the pressure of the fuel mixture within the combustion chamber 13 builds up to a predetermined degree, the outwardly urged pressure switch button 125 bridges the contacts 137 and 138, thereby closing the pressure switch and closing the circuit to the spark plug 101, the circuit between leads 107 and 105 having already been established by contact of the exhaust valve with its seat.

Upon completion of the circuit to the spark plug, it fires in the mixture and there is an explosion in the combustion chamber. Since the pressure due to combustion is higher than the pressure of the incoming fuel mixture, the sliding valve 66 is now forced to the left in Figure 1 thereby closing the inlet port and opening the exhaust port and allowing the combustion products to escape through the exhaust valve and spider 21 to enter the exhaust turbine within section 14 which is driven thereby. The products of combustion exhausting from this turbine pass through the exhaust conduit 15 and aid in jet propulsion of the craft to which the power plant is attached, or accomplish any other purpose depending upon the use to which the power plant is put.

Since rotor 38 of the exhaust turbine is secured to shaft 16, the latter is driven thereby and at its forward end shaft 16 drives rotor 23 of the compressor and is connected by a gear designated at 190 to drive an air propeller or any other mechanism adapted to be powered by the power plant. Usually a starting device is included in the gearing at 190, which becomes inoperative after the power plant starts to operate.

The symmetrical arrangement of my apparatus about the axis of the power shaft 16 renders the whole remarkably well balanced in operation and free of unbalance which might interfere with the operation of the draft. The sliding valve control of the intake and outlet of the combustion chamber is accomplished automatically and sequentially in response to feed of the fuel mixture and the explosion in the combustion chamber, so that no valve control mechanism is necessary. Furthermore, the action of the pressure switch is such that ignition and explosion in the combustion chamber is delayed until adequate pressure has been built up in the combustion chamber, whereby an adequate explosion is insured to obtain optimum power from the power plant. The pressure switch action is a control over the frequency and the intensity of combustion in the combustion chamber, and this may be adjusted by rotating collar 128 for changing the force resisting outward movement of button 125. The action of valve 66 provides optimum fuel economy since the valve prevents all but products of combustion from escaping through the exhaust valve, so that all of the fuel is burned and contributes its part to power generation. The valve 66, in combination with the ignition controls, provides complete and positive combustion control during operation. Although use of the invention in a moving craft is mentioned in the preferred embodiment selected for illustrative purposes, it may be embodied in a stationary power plant without departing from the spirit of the invention.

This invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a gas turbine power plant assembly, an axial flow compressor having an air intake, means at the discharge end of said compressor for admixing fuel with the compressed air, a combustion chamber having an inlet port for said mixture of compressed air and fuel and an axially spaced outlet port for discharging products of combustion, a movable valve member urged to open said inlet port and close said outlet port in response to pressure of said combustible mixture and urged to open said outlet port and close said inlet port when combustion takes place in said chamber, a turbine driven by the products of combustion exhausted through said outlet port drive coupled to said compressor, and a discharge aperture for the products of combustion beyond said turbine.

2. In a gas turbine power plant assembly, an axial flow compressor having an air intake, means at the discharge end of said compressor for admixing fuel and air, a combustion chamber having an inlet port for said mixture of compressed air and fuel and an exhaust port for discharging products of combustion, a shiftable valve member having fixedly spaced valve faces adapted to coact with the respective ports, said valve member being movable in response to pressure of the combustible mixture to seat one of said valve faces on said outlet port to thereby close said outlet and open the inlet and said valve member being movable when combustion takes place in said chamber to seat the other of said valve faces on said inlet port to thereby close said inlet and open said outlet, and an exhaust turbine driven by the products of combustion exhausted through said outlet port drive coupled to said compressor.

3. In a gas turbine power plant, an axial flow compressor, an exhaust turbine, a combustion chamber between said compressor and said turbine, a shaft driven by said exhaust turbine extending through said combustion chamber and drive connected to said compressor, and a valve member for said combustion chamber slidably mounted on said shaft within said combustion chamber.

4. In the gas turbine power plant defined in claim 3, said valve member being coaxial with and surrounding the associated supporting part of said shaft within the combustion chamber.

5. In a gas turbine combustion chamber, an exhaust valve seat, a slidable valve, spaced ignition circuit contacts on said seat and conductor means on said valve for bridging said contacts to close said circuit when the valve contacts said seat.

6. In the combustion chamber defined in claim 5, a switch in said circuit closed in response to a predetermined pre-ignition pressure of the combustible mixture in said chamber.

7. In a gas turbine power plant, a combustion chamber into which a combustible mixture is introduced under pressure and having an exhaust port, an exhaust valve, an ignition electrode in said chamber, a switch in the energization circuit of said electrode closed by seating of the exhaust valve in said port, and an additional switch in said circuit closed when said pressure attains a predetermined amount.

8. In a gas turbine power plant, an axial flow compressor, a combustion chamber and an exhaust turbine arranged in order in axial succession, a power output shaft extending through said combustion chamber driven by said turbine and connected to drive said compressor, said turbine and said compressor being arranged substantially symmetrically about said power output shaft, and combustion control valve means mounted on said shaft and disposed entirely in said combustion chamber.

9. In a gas turbine power plant, a combustion chamber having an annular valve seat, a reciprocable valve in said chamber provided with an annular valve face adapted to contact said seat, and means mounting said valve for free rotation about its axis of rotation for providing uniform wear of said valve seat and face during operation.

10. In a gas turbine power plant, a combustion chamber having spaced annular inlet and exhaust ports and a power shaft projecting therethrough, a valve member freely rotatably and slidably mounted on said shaft between said ports and having spaced annular faces adapted to seat at the respective ports depending on the location of the valve member.

11. In a gas turbine power plant, a compressor, a combustion chamber and an exhaust turbine arranged in substantially symmetrical relation about an axis, a shaft on said axis driven by said exhaust turbine and extending through said combustion chamber to drive said compressor, a valve member mounted for reciprocation and rotation on said shaft within the combustion chamber, and cooperating valve seating surfaces on said combustion chamber and said valve member.

RUSSELL W. RIECK.

REFERENCES CITED

The following references are of record in the file of this patent:

UNITED STATES PATENTS

| Number | Name | Date |
|---|---|---|
| 1,088,761 | Anderson | Mar. 3, 1914 |
| 1,310,668 | Miller | July 22, 1919 |
| 1,346,509 | Olhovsky | July 13, 1920 |
| 1,672,529 | Holzwarth | June 5, 1928 |
| 1,854,615 | Lasley | Apr. 19, 1932 |
| 1,967,851 | Wilson | July 24, 1934 |
| 1,980,266 | Goddard | Nov. 13, 1934 |
| 2,326,072 | Seippel | Aug. 3, 1943 |
| 2,485,813 | Carlson | Oct. 25, 1949 |

FOREIGN PATENTS

| Number | Country | Date |
|---|---|---|
| 152,872 | Great Britain | Oct. 28, 1920 |
| 223,250 | Germany | June 18, 1910 |
| 246,446 | Italy | Mar. 23, 1926 |
| 95,141 | Switzerland | June 1, 1922 |